March 3, 1970     F. F. RICHARDS     3,498,629

EASILY TRANSPORTABLE LUGGAGE

Filed March 15, 1968

INVENTORS
FRED F. RICHARDS

Richards, Harris & Hubbard
ATTORNEY

# United States Patent Office 3,498,629
Patented Mar. 3, 1970

3,498,629
EASILY TRANSPORTABLE LUGGAGE
Fred F. Richards, 6837 Chevy Chase,
Dallas, Tex. 75225
Filed Mar. 15, 1968, Ser. No. 713,510
Int. Cl. B62b 1/10
U.S. Cl. 280—47.13        2 Claims

ABSTRACT OF THE DISCLOSURE

A suitcase or the like having apertures through the front and back faces thereof proximate a corner of the case for receipt of an axle which upon insertion through the apertures will protrude from both faces to receive first and second wheels. Means are provided for removably retaining the wheels on the protruding ends of the axle thereby permitting easy removal of the wheels and the axle when the suitcase is to be stored or shipped with other suitcases. In a preferred embodiment, the suitcase includes brackets affixed to the frame of the suitcase for supporting a bearing tube through which the axle is passed to thereby transfer any weight imposed upon the axle to the frame of the suitcase and prevent damage to front and back faces of the case. A handle is also provided at the corner of the suitcase diagonally opposite the corner proximate which the wheels are mounted to permit easy manipulation of the suitcase by user. If the suitcase is rectangular in configuration, the handle is attached to the longer of the two sides which form the corner diagonally opposite the corner proximate which the wheels are mounted.

FIELD OF THE INVENTION

This invention relates to luggage and more particularly to luggage which is adapted to have wheels mounted thereon to facilitate movement of the luggage.

THE PRIOR ART

It is often necessary, when traveling, to transport luggage over considerable distances, for example, between the baggage area of an airport and an automobile which may be parked a great distance away.

Others have appreciated this problem and others inherent in transporting luggage and have made various attempts to solve these problems by attaching various types of wheel structures to the luggage. Typical of such attempts are those described in U.S. Patents 2,439,660; 2,919,138; and 2,917,317. Prior attempts to provide luggage with wheels have had several disadvantages. One disadvantage suffered by many of the attempts to mount luggage with wheels is that the wheels are, due to space limitations, quite small. Small wheels create difficulty when the luggage is being transported over rough pavement, cobblestones or the like since they become lodged in cracks and crevices. It is also common to find that the structure which mounts the wheels to the luggage is exceedingly cumbersome and large which detracts from the appearance of the luggage and renders it expensive to manufacture. Due to the requirements of various common carriers, it is necessary in the design of wheel mounted luggage to provide structures which will permit removal of the wheels or retraction of the wheels to produce a smooth surfaced piece of luggage as common carriers will not accept luggage having large protuberances which might damage other pieces of luggage with which a particular piece of luggage may be transported. None of the prior art structures provide luggage which may be easily transported by its user, is simple in design, and which will be accepted by common carriers for transportation with other luggage.

SUMMARY

The present invention overcomes the difficulties experienced with prior art structures and provides an easily transportable item of luggage which comprises a case having a frame and front and back faces joined at their peripheries to the frame. The front and back faces are provided with registering apertures adjacent the frame. An axle is provided which is adapted to be passed through the registering apertures and extend from each of the faces for receipt of the first wheel on one end thereof and the second wheel on the opposite end thereof. Means are provided for removably retaining the first and second wheels upon the axle thereby permitting easy removal of the first and second wheels as well as the axle for easy transportation of the luggage by a common carrier.

THE DRAWINGS

For a more complete understanding of the present invention, reference may be had to the following description taken in conjunction with the accompanying drawings in which.

THE PREFERRED EMBODIMENTS

Figure 1:
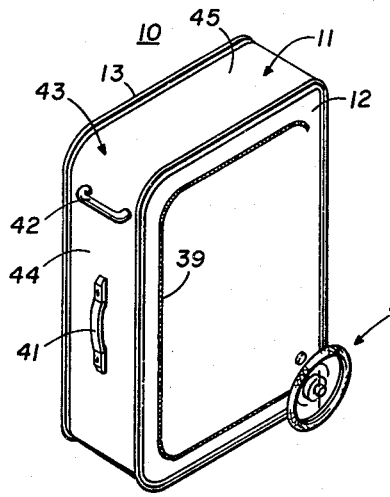
FIGURE 1 is a perspective view of one embodiment of present invention.

With particular reference to FIGURE 1, a suitcase 10 includes a generally rectangular frame 11 and front and back faces 12 and 13, respectively, which are joined at their peripheries to frame 11 in a conventional manner.

Figure 2:
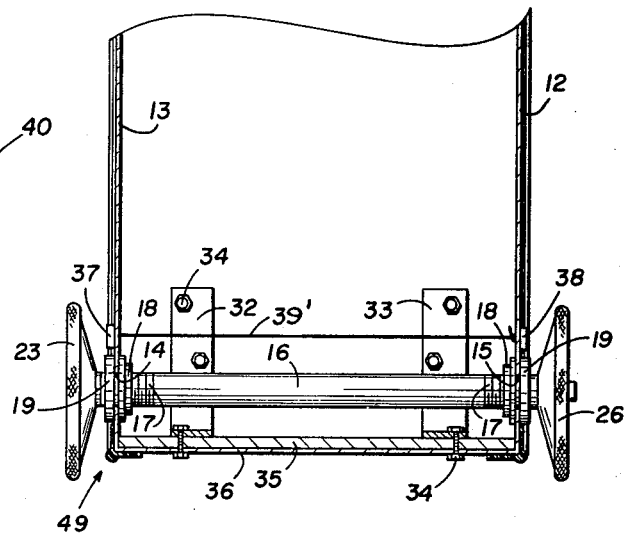
FIGURE 2 is a cross sectional view, partially cutaway, to illustrate in more detail the embodiment of the invention illustrated in FIGURE 1.

As particularly illustrated in FIGURE 2, front face 12 and back face 13 of suitcase 10 are provided with registering apertures 14 and 15 through which pass a bearing tube 16 having threads 17 at each end thereof. Threaded portions 17 of bearing tube 16 each receive interiorly of suitcase 10 an inner sealing nut 18 and outer sealing nut 19 which cooperate to retain therebetween faces 12 and 13.

Figure 3:
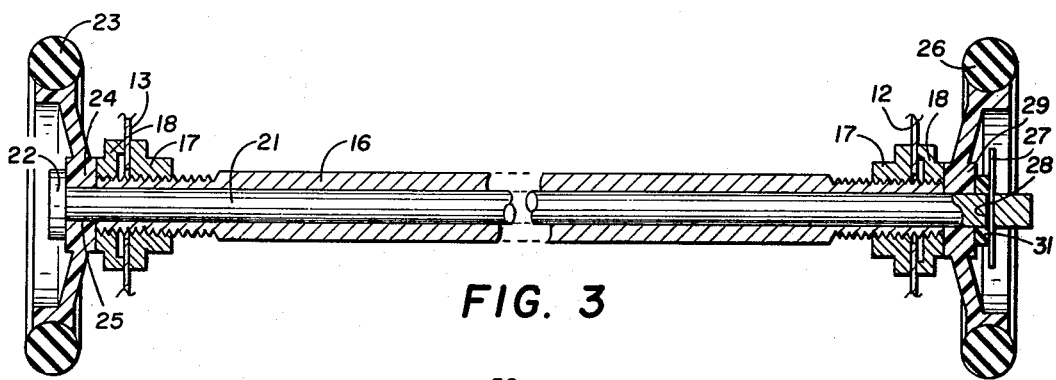
FIGURE 3 is an enlarged sectional view of the wheel structure illustrated in FIGURES 1 and 2.

As more particularly illustrated in FIGURE 3, bearing tube 16 receives therethrough an axle 21 the opposite ends of which protrude beyond faces 12 and 13 of suitcase 10. One end of axle 21 is provided with a flange 22 which serves to retain wheel 23 on axle 21 by engagement with hub portion 24 of wheel 23. Hub portion 24 is provided with an aperture 25 through which axle 21 passes. The opposite end of axle 21 is provided with a wheel 26 which is retained on axle 21 by a pin 27 received through an aperture 28 in axle 21. Pin 27 is spaced from the hub portion 29 of wheel 26 by a washer 31 in a conventional manner.

In order that any weight to be supported by wheels 23 and 26 and thus axle 21 is not directly carried by front and back faces 12 and 13 of suitcase 10, bearing tube 16 is affixed to L-shaped brackets 32 and 33 by welding or the like. Brackets 32 and 33 are in turn affixed to supporting member 35 of frame 11, which conventionaly comprises plywood, by a plurality of bolts and nuts 34. The plywood 35 is, of course, covered in a conventional manner with a suitable material 36, which may comprise a fabric which matches faces 12 and 13, for example, in order to give the suitcase 10 a pleasing appearance. If the suitcase 10 is provided with fabric front and back faces, as illustrated in FIGURES 1–3, overloading of the suitcase may cause the faces 12 and 13 to move laterally, i.e., bulge, causing frictional engagement between faces 12 and 13 and wheels 26 and 23, respectively.

Means are provided for preventing frictional engagement between the faces 12 and 13 and wheels 26 and 23. The means take the form of buttons 37 and 38, the looped portions of which extend through faces 13 and 12, respectively, to receive a cord 39' which serves to maintain the buttons 37 and 38 in a predetermined spaced apart relationship.

With the embodiment illustrated in FIGURES 1-3, a user may conveniently remove wheels 23 and 26 as well as axle 21 and store them within the suitcase 10 to permit transportation of the luggage by common carrier or the like. Specifically, to remove wheels 23 and 26, the user simply straightens pin 27 to remove it from aperture 28 after which washer 31 and wheel 26 may be easily removed from axle 21. Axle 21 is then pulled from bearing tube 16 and wheel 23 removed from the axle. The axle 21, wheel 23, wheel 26, washer 31 and pin 27 may be easily stored in a minimum of space within suitcase 10 during shipment or storage of the luggage. Access to the interior of the suitcase 10 may be gained by use of a conventional zipper 39 provided on face 12.

Upon reaching destination, the user may easily remove the articles from the suitcase, apply wheel 23 to axle 21, direct the axle through bearing tube 16 and after application of washer 31 apply pin 27 through aperture 28. Due to the relatively large size of wheels 23 and 26, which may for example be constructed of Delrin or nylon, the case may be easily transported over rough surfaces with a minimum of noise.

Upon removal of the wheels 23 and 26 as well as axle 21, the luggage will present a flush appearance without protrusions which would damage other articles with which it may come in contact.

Suitcase 10 is provided with a conventional handle 41 which is most conveniently used when wheels 23 and 66 have been removed from suitcase 10. When wheels 23 and 26 are installed, as illustrated in FIGURES 1 and 2, the suitcase 10 is most easily handled by use of a second handle 42 fixed to frame 11 in a position perpendicular to the conventional handle 41. The handle 42 is affixed to frame 11 proximate corner 43 of frame 11 which is diagonally opposite corner 40. It has been determined that it is a considerable advantage to a user to locate handle 42 along side 44 of frame 11 rather than side 45 of frame 11. Thus, if suitcase 10 is rectangular in shape, as illustrated in FIGURE 1, handle 42 is most conveniently located on the longer of the two sides of frame 11 which form the corner diagonally opposite from the corner within which the wheels are mounted. By so locating handle 42, the user may conveniently pull or push suitcase 10 with a minimum of effort.

While the embodiment of the invention illustrated in FIGURES 1-3 is used in connection with a suitcase having relatively flexible faces, such as faces 12 and 13 which may be formed of fabric, the invention may also be used with suitcases having more rigid front and back faces. If the front and back faces 12 and 13 of suitcase 10 are constructed of material more rigid than a fabric, grommets and the like may be provided which will receive axle 21 therethrough without the use of a bearing tube 16 or brackets 32 and 33 as there is not as great a need for means to transfer the weight from the axle 21 to the frame of the suitcase. However, as illustrated in FIGURE 4, even suitcases of a more rigid construction are preferably provided with a bearing 2.

Figure 4:
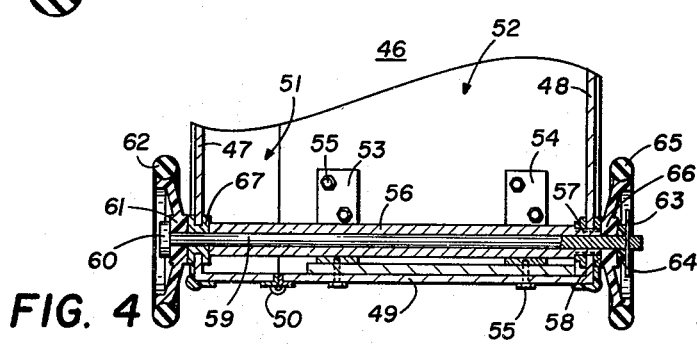
FIGURE 4 is a view similar to FIGURE 3 of another embodiment of the invention.

With reference to FIGURE 4, the suitcase 46 is provided with faces 47 and 48 joined at their periphery to a frame 49, all of which is conventional. Face 47 forms part of a lid 51 which through a conventional hinge 50 is pivoted for mating with the main body 52 of suitcase 46.

Main body 52 has mounted thereto brackets 53 and 54 by means of bolts and nuts 55. Brackets 53 and 54, as in the embodiment discussed above, are affixed to a bearing tube 56. Bearing tube 56 is provided with a reduced end 57 which passes through a rubber or plastic grommet 58 in wall 48. The opposite end of bearing tube 56 abuts a similar rubber or plastic grommet 67 in wall 47 when lid 51 is closed, as illustrated in FIGURE 4.

Bearing tube 56 receives therethrough an axle 59 one end of which has a flange 60 which serves to abut with the hub portion 61 of wheel 62 to retain wheel 62 upon the axle 59. The opposite end of axle 59 is provided with a pin 63 which cooperates with washer 64 to retain a wheel 65 upon axle 59. Axle 59 passes through the hub portion 66 of wheel 65.

With the embodiment illustrated in FIGURE 4, wheels 62 and 65 may be removed the same manner that wheels 23 and 26 were removed from the embodiment illustrated in FIGURES 1-3. Specifically, upon removal of pin 63 and washer 64, wheel 65 may be slipped from axle 59. Then axle 59 may be removed from bearing tube 56 freeing wheel 62 to permit storage of the wheels 62 and 65, axle 59, washer 64 and pin 63 within the suitcase 46. Upon removal of wheel 62 and 65, lid 51 may be opened as bearing tube 56 is not affixed to and does not pass through grommet 67.

Upon closing of lid 51, the wheels 62 and 65, axle 59, washer 64 and pin 63 may be reassembled in a manner reverse to that in which they were assembled.

The expression luggage as used herein is meant to be inclusive of various transportable cases such as musical instrument case, sample case, merchandise display case and the like. While rather specific terms have been used in describing several embodiments of the present invention, they are not intended, nor should they be construed as limitations upon the invention.

What is claimed is:

1. An item of luggage or case having a frame and including front and back faces joined at their peripheries to said frame, the front and back faces being provided with registering apertures adjacent said frame;
   means for transferring weight from said frame to an axle comprise;
   a bearing tube disposed between the apertures in said faces for receiving an axle therethrough; and at least one bracket which is fixed to said bearing tube and said frame.

2. The apparatus of claim 1, wherein said apparatus includes:
   means affixed to said bearing tube and in engagement with the sides of said case for sealing space between said bearing tube and apertures thereby preventing entry of particles into said case through said apertures.

References Cited
UNITED STATES PATENTS

| 1,751,013 | 3/1930 | McMullen | 301—113 |
| 2,439,660 | 4/1948 | Keil | 190—18 |
| 3,311,417 | 3/1967 | Uribe | 301—5.7 |

LEO FRIAGLIA, Primary Examiner

J. A. PEKAR, Assistant Examiner